Patented Dec. 18, 1951

2,579,367

UNITED STATES PATENT OFFICE 2,579,367

BANDAGE

Raymond M. Curtis, John H. Brewer, and Arthur E. Stickels, Baltimore, Md., assignors to Hynson, Westcott & Dunning, Incorporated, Baltimore, Md., a corporation of Maryland No Drawing. Application November 24, 1950,
Serial No. 197,500

20 Claims. (Cl. 167—84)

This invention relates to a method of treating burns, wounds, bed sores, ulcers, skin abrasions, skin grafts and other external pathological conditions and to the combination of a proteinaceous solution or paste with a coagulating bandage for use in said method.

It is customary in treating burns and similar pathological conditions to cover the damaged area to stop or retard the flow of plasma from said area and to protect the area against access of pyrogenic organisms. One such well-known treatment for burns is to cover the burned area with petroleum jelly and to superpose a cloth or gauze bandage. This method does not effectively stop the flow of plasma and frequently results in a collection of plasma under the bandage and lysis at the area requiring remedial measures. Another well-known method of treating burns is to apply a coagulant for plasma and cellular protein such as tannic acid to the burned area but this method not only uses the plasma protein thereby incurring hemo concentration but also adds to the destruction of tissue and thereby retards the healing process.

Another known method is to apply a proteinaceous paste to the area and allow it to set or harden by drying but this method does not prevent the loss of plasma protein because the paste is and remains soluble and frequently is prevented from drying by the exudation of plasma. Still another method of treating burns is to apply a solid film such as polyvinyl chloride over the area but this method, like the petroleum jelly method, tends to form blisters of plasma under the film which are objectionable. Numerous other methods of burn treatment have been tried but all of them, so far as we have been able to determine, involve objectionable features or defects and are not entirely satisfactory.

An object of our invention is to provide a method and a combination of materials for use in the treatment of burns and analogous pathological conditions which will form an artificial eschar over the area which will stop the loss of plasma protein, will not damage tissue or prevent or retard healing, will not be washed away by the exudation of plasma and will permit the escape of plasma serum and thus prevent the formation of plasma blisters. Other objects and advantages of our invention will appear in the following detailed description.

Basically our invention resides in applying a coating of a proteinaceous aqueous solution or paste over the area to be treated and then applying to the coating a protein coagulant whereby the coating promptly is converted into an insoluble semi-permeable artificial eschar. More specifically, considering the variety of essential and desirable characteristics of a burn treatment including cost of materials, convenience of handling in remote places and by unskilled persons, maintenance of supplies, comfort of the injured person, care of the injured person after initial application of the treatment, etc., we have worked out a specific preferred proteinaceous paste and a specific coagulant therefor which will now be described in detail, following which we will describe some of the permissible variations which we regard as falling within the scope of our invention.

Our preferred proteinaceous paste is made by mixing 30 parts of casein, 4 parts of sodium lauryl sulfate, 13 parts of a 50% sodium lactate solution in water, 0.7 part of sodium hydroxide and 140 parts of water (all parts by weight) and autoclaving the mixture for about 20 minutes at about 121° C. Although not essential, the mixture preferably is made by dissolving the caustic soda in the water and then adding the other ingredients with stirring until a smooth solution is obtained. The resulting product is sterile and is either put into suitable containers under aseptic conditions or is transferred to suitable sealed containers and again sterilized by heating for about 20 minutes at about 121° C. It is a clear, light brown or amber liquid which is sufficiently fluid for application by means of a spatula but sufficiently viscous that a thick layer will adhere to the surface being treated until a bandage can be applied. It has a pH value of from 6 to 8.

The proportions of the ingredients of the composition may be varied within reasonable limits, some of them may be wholly omitted, and all of them excepting water may be substituted wholly or in part by other materials. A protein material is essential and the protein must be dissolved by the action of an alkali, that is, it must be converted into a soluble proteinate such as sodium or potassium caseinate.

While casein, due to its low cost, its animal origin, its compatibility in contact with human tissue, etc., appears to be the best protein for use in our proteinaceous paste composition, other proteins including blood serum and egg albumen may be substituted wholly or in part for the casein. In selecting a protein for use in our composition care must be taken to select one which is free of toxic or irritating components bearing in mind that some individuals are sensitive to certain proteins or to the amino acid components thereof or to other materials commonly associated with such proteins.

Any alkali which will react with the protein to produce a water-soluble proteinate may be substituted for the sodium hydroxide provided that it is non-toxic and non-irritating. Logically, sodium hydroxide and potassium hydroxide appear to be the most suitable alkalies.

The ratio of alkali to protein may vary bearing in mind, however, that the composition must not be so strongly alkaline as to damage the injured area. The pH value of the protein solution should be within the range from 6 to 8 and preferably as near as possible to the pH value of blood plasma.

The protein should be more or less hydrolyzed by the heating and treatment with alkali to which it is subjected. It appears to be impractical to dissolve protein in an alkali and to sterilize the solution without some hydrolysis whereby the protein molecules are broken down to smaller molecules or even to some extent to proteoses, peptoses or the amino acid building blocks of the protein molecule. If the protein were not hydrolyzed at all the eschar formed as described above would tend to be too hard or rigid and fragile. On the other hand, if the protein were completely hydrolyzed to the component amino acids the solution would be incapable of coagulation to form a coherent water-insoluble mass or artificial eschar. While we know that partial hydrolysis occurs in the production of the protein solution and that considerable variation of the conditions which affect hydrolysis of the protein is permissible, we have not been able up to the present time to determine and define the degree of hydrolysis.

The consistency of the paste can of course be varied by variation of the water content or the ratio of water to protein in the composition.

It has been found to be desirable to have in the composition both a wetting agent and an antiseptic agent. The wetting agent is useful in facilitating the wetting of the injured and adjacent area by the paste and the antiseptic agent is desirable for obvious reasons. The sodium lauryl sulfate ingredient of the above described composition admirably serves both of these purposes. It will be evident, however, that the proportion of sodium lauryl sulfate may be varied and also that it may be omitted entirely without completely destroying the utility of the composition. It will be evident also that one or the other or both functions of the sodium lauryl sulfate may be supplied by the substitution of other wetting agents or antiseptic or antibiotic agents or both.

The sodium lactate serves as plasticizer for the composition and more particularly serves to produce an artificial eschar which is plastic or elastic as distinguished from being hard and brittle or fragile. As a result of extensive experimentation the sodium lactate has been found to be admirably suited for use in our composition but we wish it to be understood that we recognize and appreciate that the sodium lactate ingredient may be omitted without completely destroying the utility of the composition and we further recognize that it may be substituted wholly or in part by other plasticizing agents. The presence of the sodium lactate in the composition becomes more important as the injury heals, exudation of moisture ceases and the eschar tends to dry and harden.

As will be seen from the foregoing discussion, the protein composition or paste consists essentially of a soluble salt of a partially hydrolyzed or degraded protein and water, that the composition preferably contains also a wetting agent, an antiseptic agent and a plasticizing agent and that the preferred composition is composed of the reaction products of casein, caustic soda and water together with sodium lauryl sulfate and sodium lactate in about the proportions specified. We recognize that other ingredients such as other antiseptic or antibiotic agents, coloring materials and odorizing materials may be added to the composition without departing from our invention. Local anaesthetic agents may be added but appear to be superfluous because application of the paste to burned and other injured or diseased areas generally provides immediate and substantially complete relief from such pain as might be relieved by a local anaesthetic.

As the protein coagulant or precipitant we have tried a variety of materials. Due to the requirements of the coagulant, i. e., it must be non-toxic, non-irritating, capable of being sterilized, capable of being incorporated into a bandage, etc., we have found that only relatively few of the metal salts are suitable for use. Some of the metal salts tested, aluminum sulfate, for instance, were ineffective, others, calcium acetate, for instance, would not withstand the sterilizing treatment but decomposed and calcium chloride was too hygroscopic. Some metal salts when applied as a solution to surgical gauze did not adhere well to the gauze and tended to dust off of the gauze when dried. Among the numerous materials capable of coagulating or precipitating protein from solutions of its alkali metal salts we have found three metal salts which are entirely suitable for use, e. g., water-soluble salts of divalent zinc, manganese and cobalt and specifically zinc acetate, cobalt sulfate and manganese sulfate. When cloth such as surgical gauze, preferably a multi-ply gauze, is wetted with a concentrated aqueous solution of either of these salts and dried, so that the fabric contains about 25 percent of its weight of the salt, the fabric is acceptable in appearance and other physical properties for use as a bandage. The salt adheres well to the fabric and the fabric withstands sterilization, e. g., heating to about 121° C. for 20 minutes without appreciable damage. Such a metal salt-impregnated fabric contains sufficient salt that when a single layer of the fabric is applied to a coating of the protein paste of the thickness usually applied to a burn or similar injury, e. g., up to one-eighth inch, the protein will be quickly coagulated or transformed into a coherent water-insoluble flexible artificial eschar having the properties of a semipermeable membrane, i. e., capable of transmitting or diffusing the water content of plasma but impermeable to the plasma protein. Other salts which appear to be suitable for use are nickel nitrate, copper sulfate and cerium nitrate although these salts have not been fully tested for toxicity.

The chemical reaction, if any, which takes place when the metal salt of the bandage comes into contact with the protein paste is not definitely known but it appears probable that the sodium caseinate of the paste reacts with the metal salt of the bandage to form the corresponding metal caseinate.

We appreciate that the results of our invention may be accomplished in other ways than as described above. For instance, the cloth impregnated or coated with metal salt might be moistened immediately before application to the protein paste or fabric such as surgical gauze might be wetted with metal salt solution immediately before application to the protein paste or the metal salt might be applied to the protein paste as a powder or solution independently of the fabric bandage. However, as an article of manufacture suitable for storage and for immediate or emergency use the protein paste should be supplied in sterile sealed containers and the metal salt impregnated fabric in the form of sealed sterile packages of surgical bandage.

The artificial eschar formed by our method adheres well, does not flow like petroleum jelly, does not become rigid or brittle upon drying, and does not deteriorate. If occasion should arise to remove the artificial eschar or a portion of it, it generally can be detached without excessive discomfort to the patient or damage to the injured area. Upon soaking with water it becomes quite soft and sufficiently weak or non-cohesive and non-adherent to permit it to be detached from the injured area.

It will be appreciated that our bandage while protecting the injured area and preventing loss of plasma protein does not damage or destroy tissue or interfere with the healing process. It does not permit the formation of blisters of plasma under the bandage with the attendant danger of infection or lysing of the adjacent cellular tissue. Its composition and physical properties are very similar to those of a naturally formed eschar. Healing occurs in the same manner and at the same rate as with a natural eschar.

An important feature of our bandage is that immediately upon application of the metal salt-impregnated fabric to the proteinaceous paste, the paste penetrates into the pores of the fabric and is immediately coagulated thus forming a solid sheet which prevents further flow of the paste into or through the fabric. Thereafter the coagulation of the paste continues inwardly as the salt penetrates by diffusion until finally the complete thickness of the paste coating is coagulated into a unitary artificial eschar.

The artificial aschar so formed together with the cloth bandage serve as a flexible cast and avoids the need for bulky pressure dressings or plaster casts frequently used in treating burns and other injuries.

We claim:

1. A dressing for burns, wounds, bed sores, ulcers, skin abrasions, skin grafts and similar pathological conditions consisting essentially of the reaction products of a film consisting essentially of an aqueous solution of an alkali soluble, non-antigenic, heavy - metal - salt - coagulatable protein and a layer of fabric carrying a non-toxic, heat sterilizable, water soluble heavy metal salt coagulant for said protein, said fabric being in operative contact with said film.

2. A dressing as defined in claim 1 in which the protein is a member of the group consisting of casein, blood serum protein and egg albumen.

3. A dressing as defined in claim 1 in which the coagulant is a member of the group consisting of salts of zinc, manganese and cobalt.

4. A dressing as defined in claim 1 in which the protein is casein.

5. A dressing as defined in claim 1 in which the coagulant is zinc acetate.

6. A dressing as defined in claim 1 in which the protein is casein and the coagulant is zinc acetate.

7. A dressing as defined in claim 1 in which the protein solution contains water and the reaction products of casein and sodium hydroxide.

8. A dressing as defined in claim 1 in which the protein solution is formed by dissolving casein in an aqueous solution of an alkali metal hydroxide in the presence of sodium lauryl sulfate and sodium lactate and heating the solution at sterilizing temperature and the coagulant is a salt of a metal of the group consisting of zinc, cobalt and manganese.

9. A dressing as defined in claim 1 in which the protein solution is formed by heating a mixture of casein, water, sodium hydroxide, sodium lauryl sulfate and sodium lactate at about 121° C. for about 20 minutes and the coagulant is zinc acetate and the fabric is surgical gauze.

10. A dressing as defined in claim 1 in which the protein solution contains the reaction products of about 30 parts by weight of casein and about 0.7 part by weight of sodium hydroxide in the presence of about 4 parts by weight of sodium lauryl sulfate, about 7.5 parts by weight of sodium lactate, and about 147.5 parts by weight of water at about 121° C. for about 20 minutes and has a pH value of from 6 to 8 and the fabric is surgical gauze containing about 25% by weight of a metal salt of the group consisting of zinc acetate, manganese sulfate and cobalt sulfate.

11. A method of forming a composite sheet suitable for use as a dressing for burns, wounds, bed sores, ulcers, skin abrasions, skin grafts and similar pathological conditions which comprises forming a film consisting essentially of an aqueous solution of an alkali soluble, non-antigenic, heavy-metal-salt-coagulatable protein and applying to said film a layer of fabric carrying a non-toxic, heat sterilizable, water soluble heavy metal salt coagulant for said protein.

12. A method as defined in claim 11 in which the protein is a member of the group consisting of casein, blood serum protein and egg albumen.

13. A method as defined in claim 11 in which the coagulant is a member of the group consisting of salts of zinc, manganese and cobalt.

14. A method as defined in claim 11 in which the protein is casein.

15. A method as defined in claim 11 in which the coagulant is zinc acetate.

16. A method as defined in claim 11 in which the protein is casein and the coagulant is zinc acetate.

17. A method as defined in claim 11 in which the protein solution contains water and the reaction products of casein and sodium hydroxide.

18. A method as defined in claim 11 in which the protein solution is formed by dissolving casein in an aqueous solution of an alkali metal hydroxide in the presence of sodium lauryl sulfate and sodium lactate and heating the solution at sterilizing temperature and the coagulant is a salt of a metal of the group consisting of zinc, cobalt and manganese.

19. A method as defined in claim 11 in which the protein solution is formed by heating a mixture of casein, water, sodium hydroxide, sodium lauryl sulfate and sodium lactate at about 121° C. for about 20 minutes and the coagulant is zinc acetate and the fabric is surgical gauze.

20. A method as defined in claim 11 in which the protein solution contains the reaction products of about 30 parts by weight of casein and about 0.7 part by weight of sodium hydroxide in the presence of about 4 parts by weight of sodium lauryl sulfate, about 7.5 parts by weight of sodium lactate and about 147.5 parts by weight of water at about 121° C. for about 20 minutes and has a pH value of from 6 to 8 and the fabric is surgical gauze containing about 25% by weight of a metal salt of the group consisting of zinc acetate, manganese sulfate and cobalt sulfate.

RAYMOND M. CURTIS.
     JOHN H. BREWER.
     ARTHUR E. STICKELS.

REFERENCES CITED

The following references are of record in the file of this patent:

UNITED STATES PATENTS

| Number | Name | Date |
|---|---|---|
| 2,431,119 | Horvath | Nov. 18, 1947 |

OTHER REFERENCES

Ludmilla: "How Burns Are Treated Today," J. A. P. A., Prac. Pharm. Ed., May 1943, pages 154 to 157.

Curtis and Brewer: Arch. Surg., vol. 38, page 130, February 1944. Through "A Survey of Pharmacology and Experimental Therapeutics," 1947, p. 58, Anders et al.

Chase: "New Eschar Technique for Local Treatment of Burns," Surgery, Gynecology and Obstetrics, September 1947, pp 308–314.

Peterson et al.: "Local Treatment of Thermal Cutaneous Burns," J. A. M. A., August 5, 1944, pp. 969–973.